United States Patent
Eleftheriadis et al.

(10) Patent No.: US 12,490,195 B2
(45) Date of Patent: Dec. 2, 2025

(54) METHOD PERFORMED BY A RADIO NETWORK NODE FOR DETERMINING A CHANGED BANDWIDTH INTERVAL

(71) Applicant: Telefonaktiebolaget LM Ericsson (publ), Stockholm (SE)

(72) Inventors: Lackis Eleftheriadis, Valbo (SE); Ramamurthy Badrinath, Bangalore Karnataka (IN); Rafia Inam, Västerås (SE); Cecilia Nyström, Stockholm (SE); Alexandros Nikou, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 18/017,521

(22) PCT Filed: Jul. 27, 2020

(86) PCT No.: PCT/SE2020/050753
§ 371 (c)(1),
(2) Date: Jan. 23, 2023

(87) PCT Pub. No.: WO2022/025807
PCT Pub. Date: Feb. 3, 2022

(65) Prior Publication Data
US 2023/0362823 A1    Nov. 9, 2023

(51) Int. Cl.
*H04W 52/02*  (2009.01)
*H04W 72/52*  (2023.01)

(52) U.S. Cl.
CPC ....... *H04W 52/0258* (2013.01); *H04W 72/52* (2023.01)

(58) Field of Classification Search
None
See application file for complete search history.

(56) References Cited

U.S. PATENT DOCUMENTS

2013/0190027 A1    7/2013  Cao et al.
2015/0365890 A1   12/2015  Rajendran et al.

FOREIGN PATENT DOCUMENTS

CN    108134979 A    6/2018
CN    111447669 A    7/2020
(Continued)

OTHER PUBLICATIONS

3GPP, "3rd Generation Partnership Project; Technical Specification Group Radio Access Network; NR; NR and NG-RAN Overall Description; Stage 2 (Release 15)", 3GPP TS 38.300 V15.2.0, Jun. 2018, 1-87.

*Primary Examiner* — Anh Ngoc M Nguyen
(74) *Attorney, Agent, or Firm* — Murphy, Bilak & Homiller, PLLC

(57) ABSTRACT

Embodiments herein may relate to a method performed by a radio network node for handling communication over a bandwidth interval for one or more UEs, in a wireless communication network. The radio network node determines to change a currently used bandwidth interval based on a current state of usage of resources in the 5 currently used bandwidth interval related to number of UEs served and/or a current state of positions of the number of UEs served. With the proviso that it is determined to change the currently used bandwidth interval, the radio network node calculates a changed bandwidth interval to use. The radio network node then adjusts the currently used bandwidth interval to the calculated bandwidth interval; and uses the adjusted 10 bandwidth interval for communicating with the one or more UEs.

18 Claims, 10 Drawing Sheets

(56) References Cited

FOREIGN PATENT DOCUMENTS

| EP | 2360978 A2 | 8/2011 | |
|---|---|---|---|
| WO | WO-2013166698 A1 * | 11/2013 | ............ H04W 36/16 |
| WO | 2017166164 A1 | 10/2017 | |

* cited by examiner

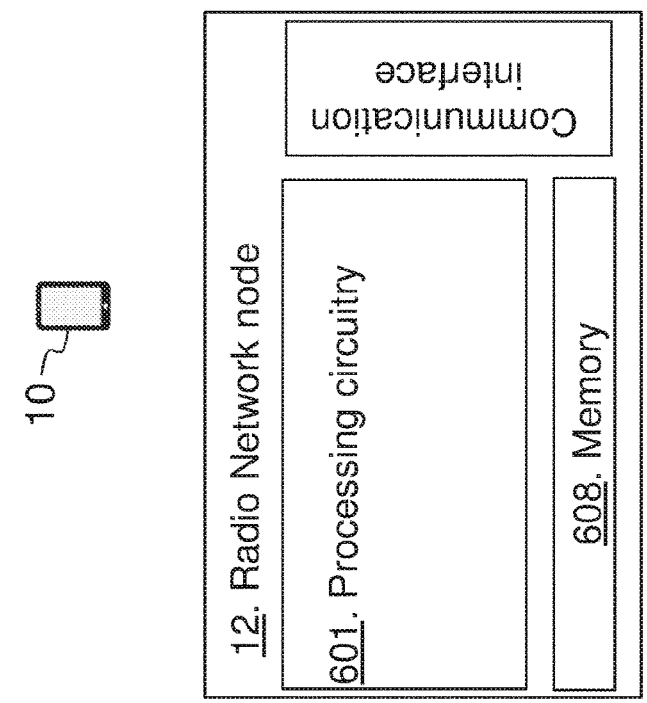
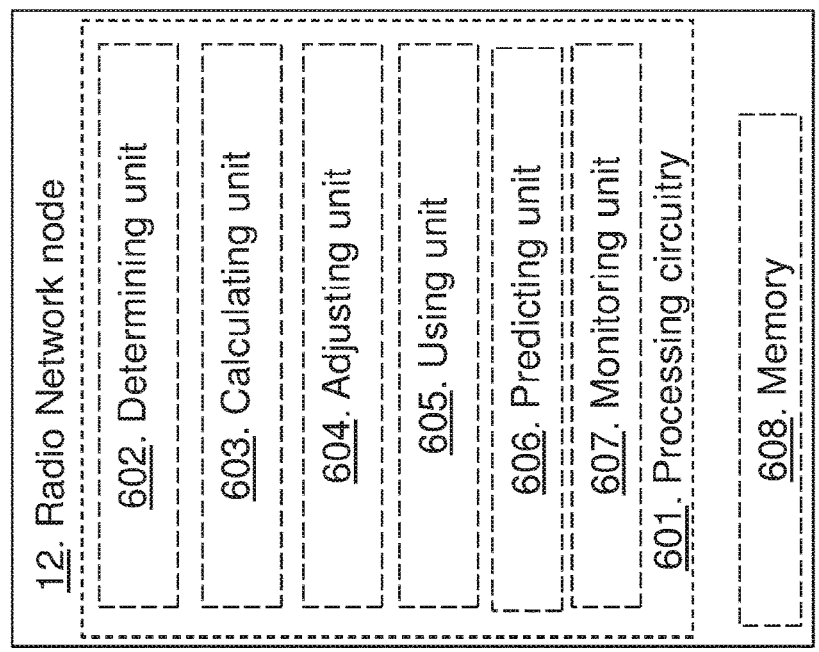
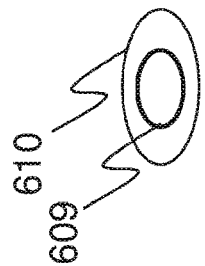
FIG. 6

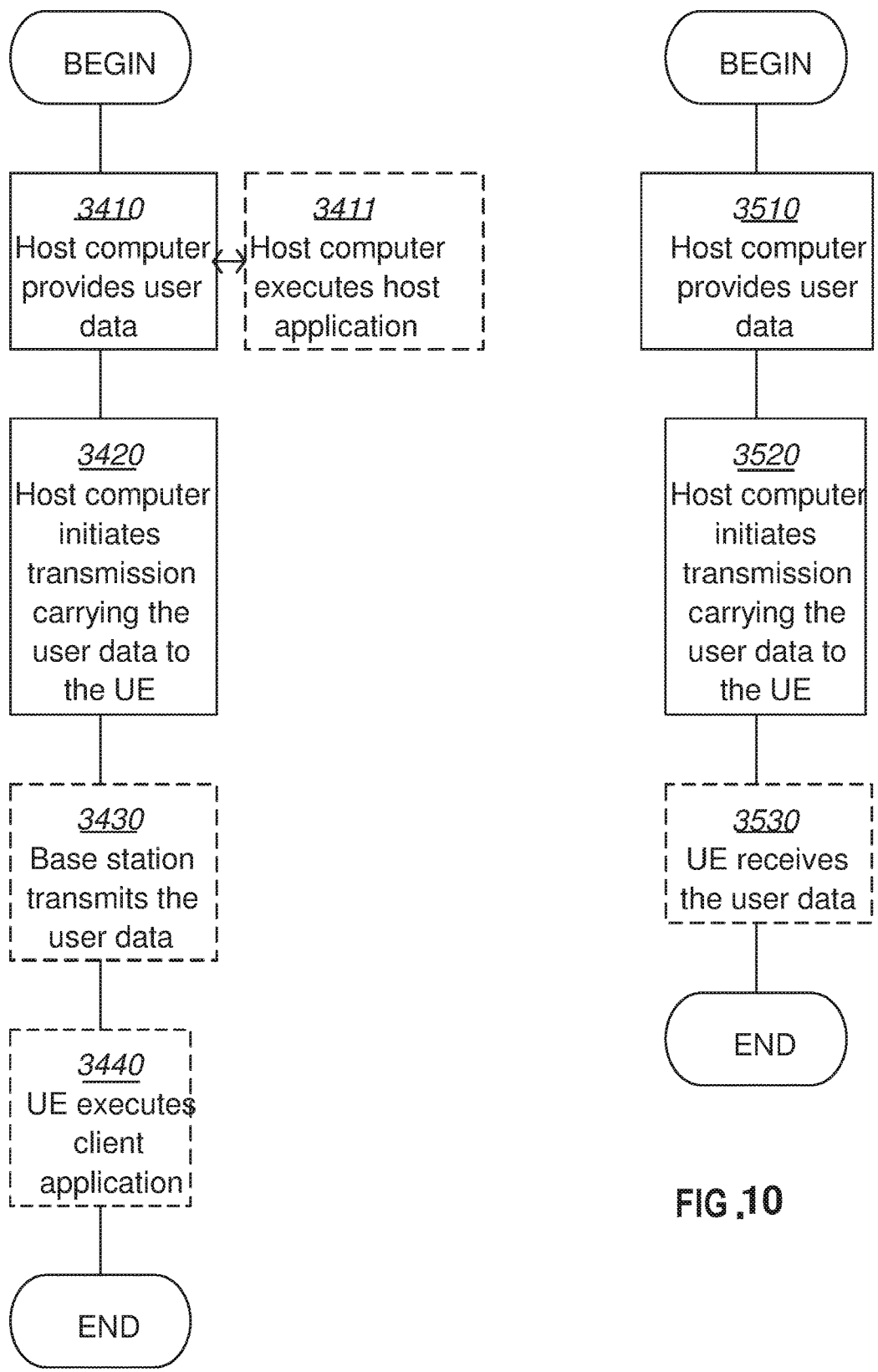

METHOD PERFORMED BY A RADIO NETWORK NODE FOR DETERMINING A CHANGED BANDWIDTH INTERVAL

TECHNICAL FIELD

Embodiments herein relate to a radio network node, and a method performed therein for communication. Furthermore, a computer program product and a computer readable storage medium are also provided herein. In particular, embodiments herein relate to enabling or handling communication of a user equipment (UE) efficiently in a wireless communication network.

BACKGROUND

In a typical wireless communication network, user equipments (UE), also known as wireless communication devices, mobile stations, stations (STA) and/or wireless devices, communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network and a Fifth Generation (5G) network, have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

The 5G system (5GS) defined by 3GPP Rel-15 introduces both a new generation radio access network (NG-RAN) and a new core network denoted as 5G core (5GC).

Similar to E-UTRAN, the NG-RAN uses a flat architecture and consists of base stations, called gNBs, which are interconnected with each other by means of the Xn-interface. The gNBs are also connected by means of the NG interface to the 5GC, more specifically to the Access and Mobility Function (AMF) by the NG-Core (C) interface and to the User Plane Function (UPF) by means of the NG-U interface. The gNB in turn supports one or more cells which provides the radio access to the UE. The radio access technology, called new radio (NR), is orthogonal frequency division multiplex (OFDM) based like in LTE and offers high data transfer speeds and low latency.

Currently there exist several features to reduce energy as e.g., by turning OFF the cell or using sleep functionality, turning OFF the power amplifier (PA), or turning OFF a certain carrier or radio access technology (RAT).

Another feature that is not automatic configurable is the Instantaneous Bandwidth (IBW), that currently is set, and fixed for every radio configuration. The bandwidth allows the Baseband unit (BBU) to allocate a certain number of UEs on different bands.

As wider the bandwidth is, more UEs can be allocated, but higher is the power consumption. Wider the bandwidth also the more reference signaling is transmitted from the radio unit, even if there are a small number of UEs. But on the other hand, reducing the bandwidth, it also reduces the capacity of the radio unit.

To save energy the Mobile Network Operator (MNO) usually from Operation Support System (OSS) or a network manager (NM), manually configure the radio units, to a certain parameter as PA output power, or setting the bandwidth, IBW on each carrier.

This bandwidth that is configured manually is called Instantaneous Bandwidth (IBW).

The purpose of the IBW is to set the frequency band range [x-y] to enable the possible channels that can be activated within the entire bandwidth that actually have UEs. However, the entire band still needs to be active (thus power consuming), depending on bandwidth allocation.

SUMMARY

Currently IBW is set manually and is not automated nor dynamic, nor adaptive to the evolving situation. Current 3GPP standard recommends IBW values of: 1.4, 3, 5, 10, 15, 20 MHz.

Currently there is a missed opportunity to reduce the power consumptions using IBW, in automated fashion using prediction, on which fast adaptation of the IBW enables more power savings.

An object of embodiments herein is to provide a mechanism for improving, in an efficient manner, performance of the wireless communication network e.g. allocating resources efficiently in the wireless communication network.

According to an aspect the object is achieved by providing a method performed by a radio network node for handling communication over a bandwidth interval for one or more UEs in a wireless communication network. The radio network node determines to change a currently used bandwidth interval based on a current state of usage of resources in the currently used bandwidth interval related to number of UEs served and/or a current state of positions of the number of UEs served. With the proviso that the radio network node determines to change the currently used bandwidth interval, the radio network node further calculates a changed bandwidth interval to use, e.g. change an IBW. The radio network node further adjusts the currently used bandwidth interval to the calculated bandwidth interval; and uses the adjusted bandwidth interval for communicating with the one or more UEs.

According to yet another aspect the object is achieved by providing a radio network node for handling communication over a bandwidth interval for one or more UEs in a wireless communication network. The radio network node is configured to determine to change a currently used bandwidth interval based on a current state of usage of resources in the currently used bandwidth interval related to number of UEs served and/or a current state of positions of the number of UEs served. The radio network node is further configured to, with the proviso that it is determined to change the currently used bandwidth interval, calculate a changed bandwidth interval to use. The radio network node is configured to adjust the currently used bandwidth interval to the calculated bandwidth interval; and to use the adjusted bandwidth interval for communicating with the one or more UEs.

It is furthermore provided herein a computer program product comprising instructions, which, when executed on at least one processor, cause the at least one processor to carry out any of the methods herein, as performed by the radio network node. It is additionally provided herein a computer-readable storage medium, having stored thereon a computer program product comprising instructions which, when executed on at least one processor, cause the at least one processor to carry out the method according to any of the methods herein, as performed by the radio network node.

Embodiments herein provide a solution that may dynamically adapt the IBW e.g. automatically reduce or increase the IBW, and signaling may be reduced thus saving energy e.g. by turning off channels to use. In some embodiments e.g. prediction of present UEs (traffic predictions) and other network state are used to automatically and dynamically adapt the IBW, as opposed to current methods where IBWs are fixed and set manually from a network manager. The determination whether to adjust the IBW may be a automatic decision that may take quality of service (QoS) of the UEs into account, thus not degrading any service and still saving power.

Embodiments herein thus, make changing bandwidth interval, e.g. IBW, more automated and adaptive to the evolving situation and changes on the network. It is herein proposed a method, that includes a predictor action and a decider action, to make the IBW changes and to adapt to current situation, reducing the bandwidth channels automatic and thereby save energy in real time. This further leads to an improved performance of the wireless communication network using radio resources in a more optimal manner.

BRIEF DESCRIPTION OF THE DRAWINGS

Embodiments will now be described in more detail in relation to the enclosed drawings, in which:

FIG. 6 shows a block diagram depicting a radio network node according to embodiments herein;

FIGS. 9 to 12 are flowcharts illustrating methods implemented in a communication system including a host computer, a base station and a user equipment.

DETAILED DESCRIPTION

Embodiments herein are described within the context of 3GPP NR radio technology (3GPP TS 38.300 V15.2.0 (2018-06)). It is understood, that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

Figure 1:
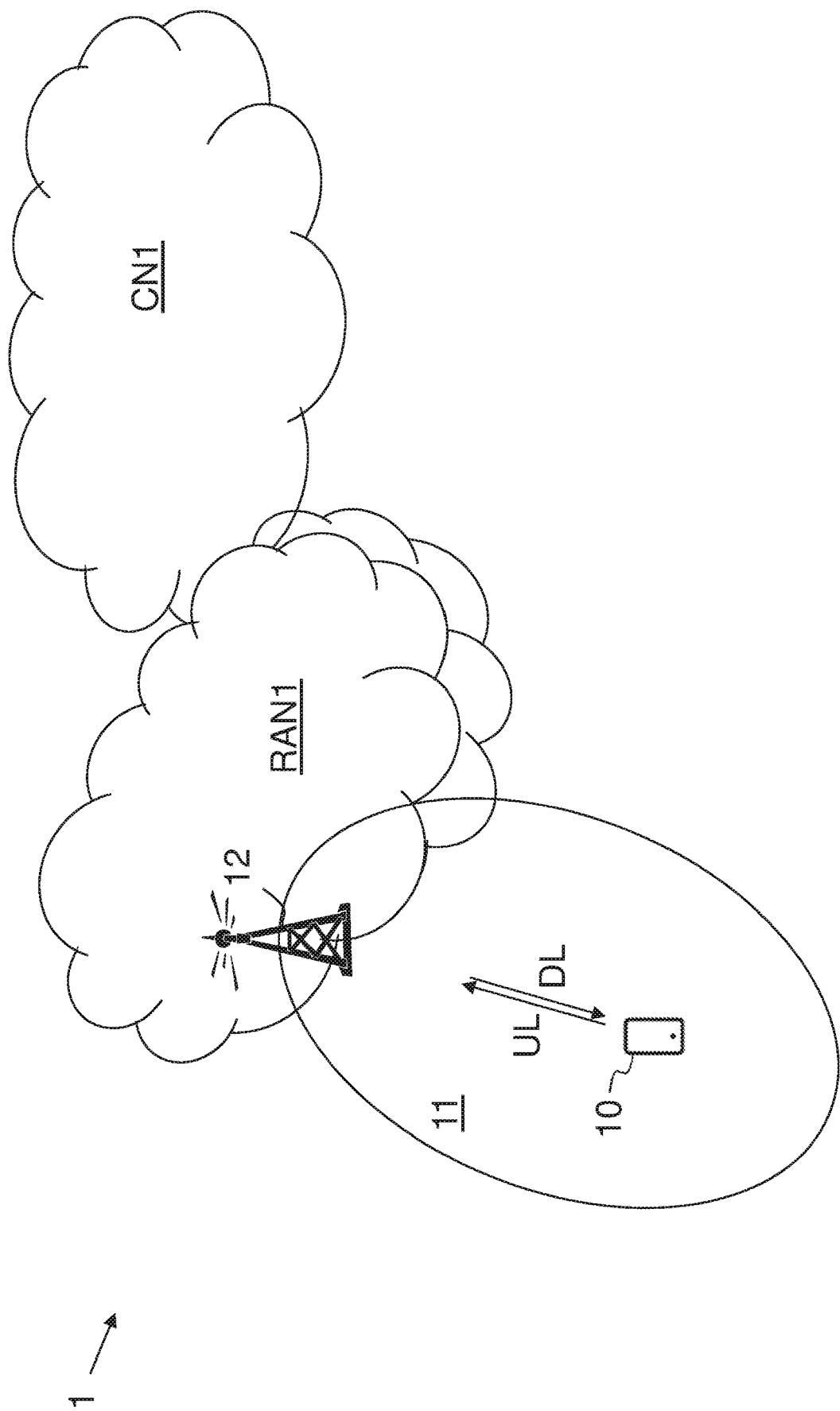
FIG. 1 shows a schematic overview depicting a wireless communication network according to a deployment of embodiments herein.

Embodiments herein relate to wireless communication networks in general. FIG. 1 is a schematic overview depicting a wireless communication network 1. The wireless communication network 1 comprises one or more RANs e.g. a first RAN (RAN1), connected to one or more CNs e.g. a first CN1. The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a UE 10 such as a mobile station, a non-access point (non-AP) station (STA), a STA, a UE and/or a wireless terminal, are connected via the one or more RANs e.g. RAN1, to the one or more CNs e.g. CN1. It should be understood by those skilled in the art that "UE" is a non-limiting term which means any terminal, wireless communication terminal, communication equipment, Machine Type Communication (MTC) device, Device to Device (D2D) terminal, internet of things (IoT) capable device, electronic device e.g. smart phone, laptop, mobile phone, sensor, relay, mobile tablets or any device communicating within a cell or service area.

The wireless communication network 1 comprises a radio network node 12. The radio network node 12 is exemplified herein as a first radio network node or a first RAN node providing radio coverage over a geographical area, a first service area 11, of a first radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the radio network node 12 depending e.g. on the radio access technology and terminology used and may be denoted as a primary radio network node. The radio network node 12 may alternatively be denoted as a serving radio network node providing a primary cell for the UE 10.

It should be noted that a service area may be denoted as cell, beam, beam group or similar to define an area of radio coverage. The radio network node may be a standalone node comprising e.g. a baseband (BB) unit and radio units separated over same or different hardware or a distributed network node distributed over a plurality of network nodes or hardware.

Embodiments herein disclose a resource efficient use for handling communications of UEs. The radio network node 12 determines to change a currently used bandwidth interval based on a current state of usage of resources in the currently used bandwidth interval related to number of UEs served and/or a current state of positions of the number of UEs served. With the proviso that the radio network node 12 determines to change the currently used bandwidth interval, the radio network node 12 further calculates a changed bandwidth interval to use, e.g. change an IBW. The radio network node 12 further adjusts the currently used bandwidth interval to the calculated bandwidth interval; and uses the adjusted bandwidth interval for communicating with the one or more UEs.

Embodiments herein automatically change the bandwidth interval used and thus the signaling, like radio resource control (RRC) signaling, may be reduced thus saving energy and enabling to turn OFF some channels. According to some embodiments herein it is using predictions or traffic predictions and other network state to automatically and dynamically adapt the currently used bandwidth interval, as opposed to current methods where e.g. IBWs are fixed and set manually from NM. The radio network node 12 may also take QoS of the UEs into account, thus not degrading any service and still saves power.

Figure 2:
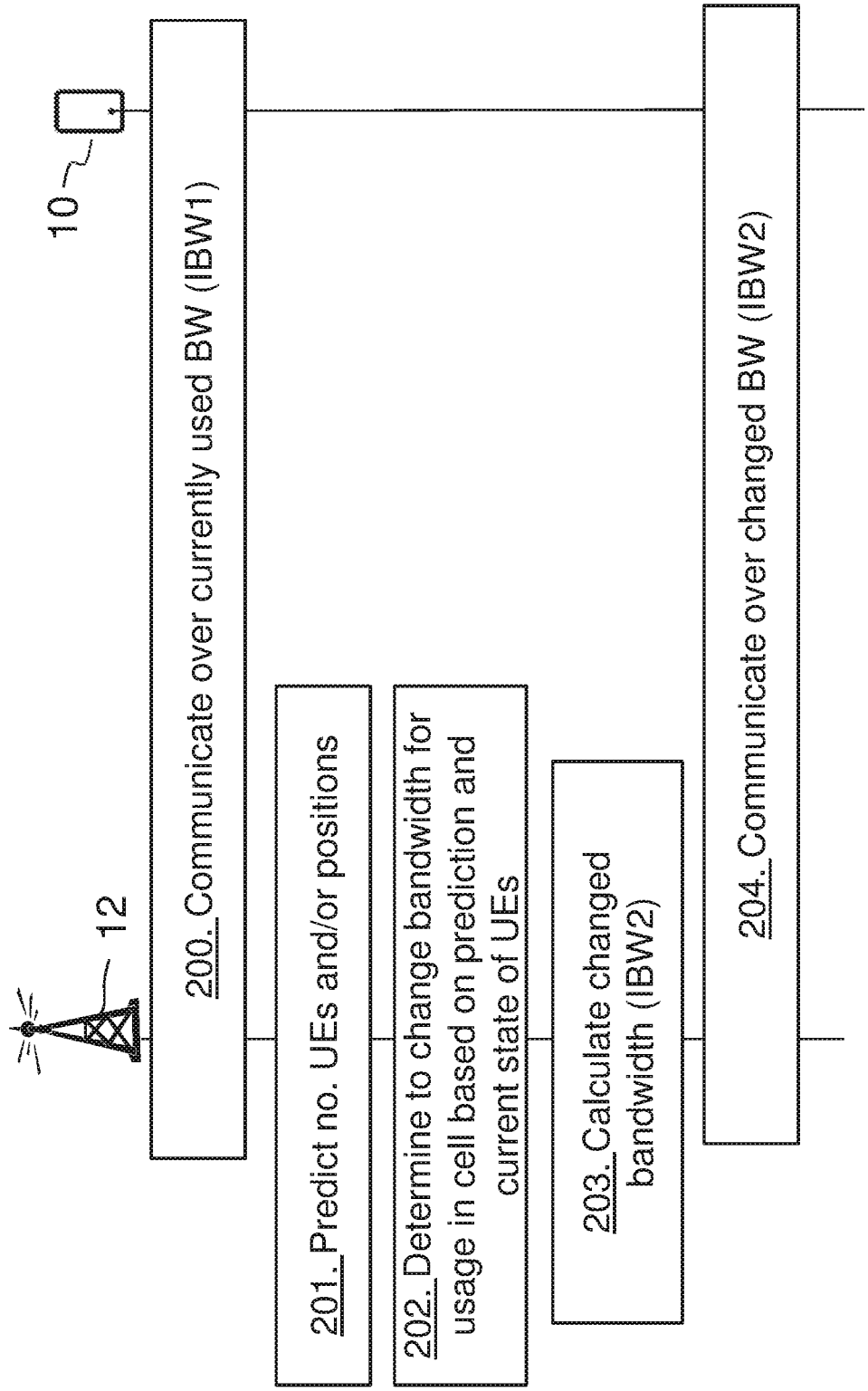
FIG. 2 is a combined signaling scheme and flowchart according of embodiments herein.

FIG. 2 is a schematic combined signaling scheme and flowchart depicting embodiments herein.

Action 200. The radio network node 12 is providing resources for the UE to communicate using resources in the currently used bandwidth interval.

Action 201. The radio network node 12 predicts number of UEs served and/or positions of the UEs in the cell of the radio network node 12.

Action 202. The radio network node 12 determines to change bandwidth interval, e.g. from IBW1 to IBW2, for usage in cell e.g. based on prediction and current state of UEs and e.g. a ML model learnt on previous behavior.

Action 203. The radio network node 12 further calculates changed bandwidth interval e.g. calculates the changed bandwidth to reduce the IBW from 10 MHz to 5 MHz.

Action 204. The radio network node may then use the calculated changed bandwidth interval. E.g. the radio network node may adjust the bandwidth interval used by moving usage of resources within the adjusted bandwidth interval (e.g. see FIG. 3).

Energy is an important part of the OPEX in running telecom systems for the operators and especially in new 5G deployments. There is a need to make efforts to decrease the energy consumption for 5G and LTE radio technology, to be more optimized and adaptable based on real time situations.

By adding an improved functionality, the 5G total energy consumption may be improved (reduced) and continue to reduce the energy trend to reduce the total site input electricity.

Embodiments herein perform a power saving in automatic fashion, to automatically adjust and reduce the bandwidth interval used e.g. the Instantaneous bandwidth (IBW) of frequency sub carriers/channels that needs to be operating in a cell. Currently IBW is set manually for each radio/carrier and embodiments herein automate it and change it dynamically, adaptive to the evolving situation.

Figure 3:
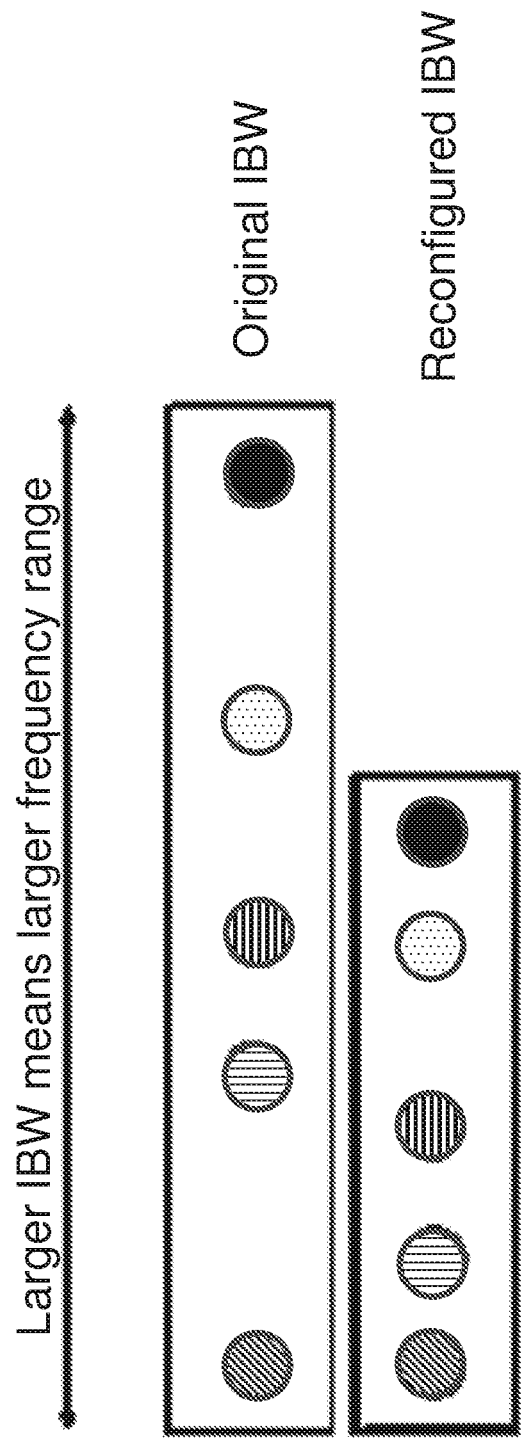
FIG. 3 shows a use of reduced bandwidth interval according to embodiments herein.

Embodiments herein show how to reconfigure the IBW dynamically at runtime so that the band is as small as possible, while retaining the service quality QoS, for the UEs. UEs that are close in physical proximity, has a tend to experience interference if their frequency channels are adjacent, that is also taking into consideration for QoS. In FIG. 3 the adjusted IBW can be seen with same UE's (circles in different patterns) located inside the bandwidth. FIG. 3 shows a dynamic reconfiguration of IBW for cell/cells.

Figure 4:
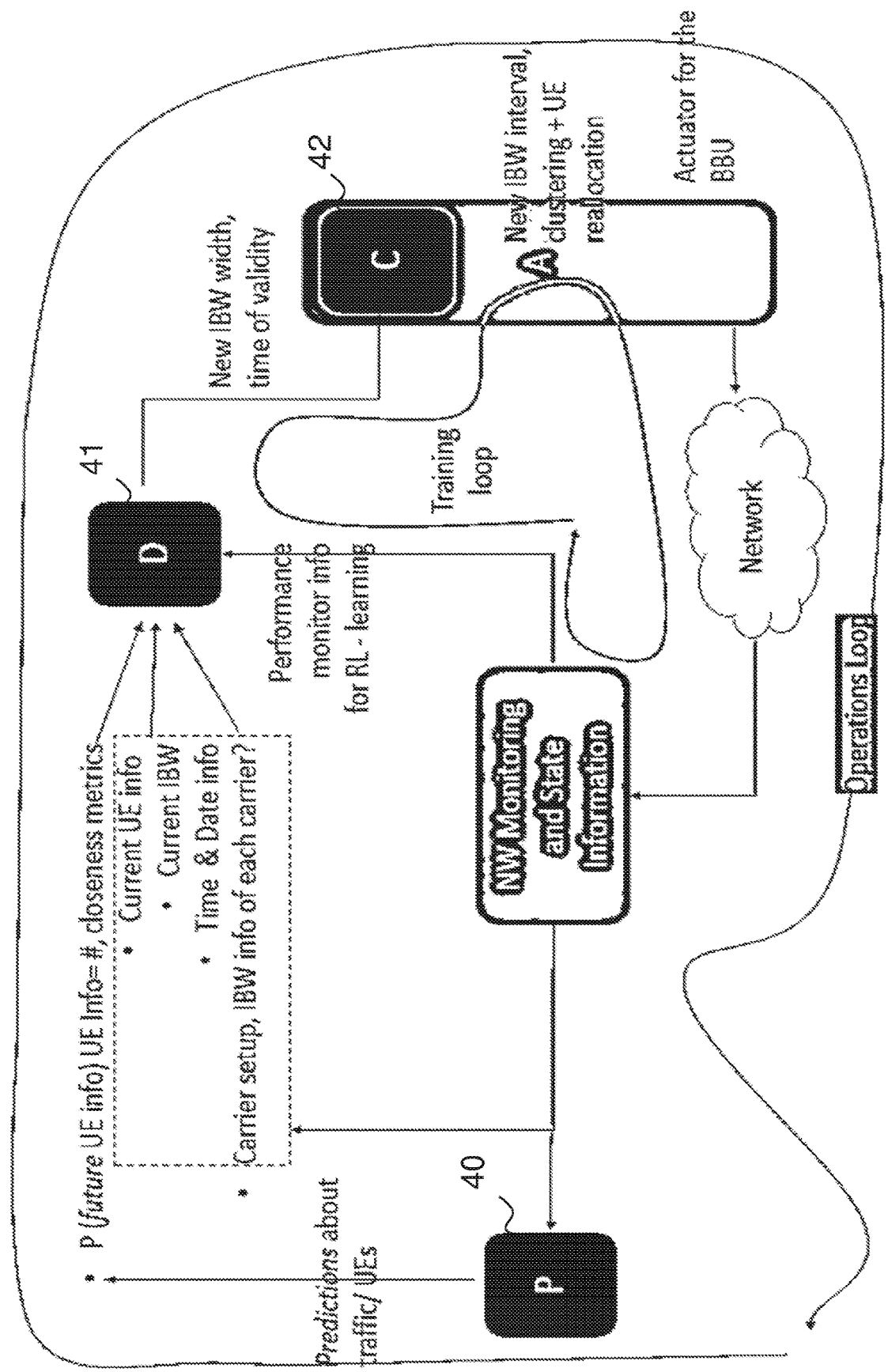
FIG. 4 shows a block diagram depicting a process in a radio network node according to embodiments herein.

Embodiments herein show three main components that may be comprised in one or more network nodes such as radio network nodes as shown in FIG. 4.

Predictor P 40: Whenever asked, or at regular intervals gives a prediction about future sequence of number of UEs expected and/or positions of these number of UEs e.g. a data traffic prediction. It should be noted that this may performed using existing methods to predict number of UEs in the cell and/or positions of the UEs. This is an example of action 501 of FIG. 5 below.

Decider D 41: This is the logic component that makes a decision, by getting input from e.g. the network monitoring function and prediction analysis about the predicted number of users from the predictor P 40. And based on this received information and its own knowledge, e.g. a reinforcement learning process also denoted as inner loop i.e. the training loop, the D 41 makes a decision to reduce or increase IBW, as presented as an outer loop i.e. the operations loop in FIG. 4. The D 41 may use outer Machine Learning model using as inputs prediction analysis results from P 40, current situation (coming from Monitoring node) and e.g. knowledge bases (ML learnt from inner loop), consequently resulting a new IBW i.e. adjusted bandwidth interval.

i. Input: Current number of UEs, information about UE position and their proximity to each other, current IBW, predictions of P 40. This may be referred to as state "S".
  ii. Output: Decision to reduce or increase the IBW, and by how much:
    Its output is a new IBW. This may be referred to as action "A".

It should be noted that the following steps may be adjusted between ranges of following steps: 1.4, 3, 5, 10, 15, 20 MHz. So, the action above may be to change to one of these bandwidth intervals.

Figure 5:
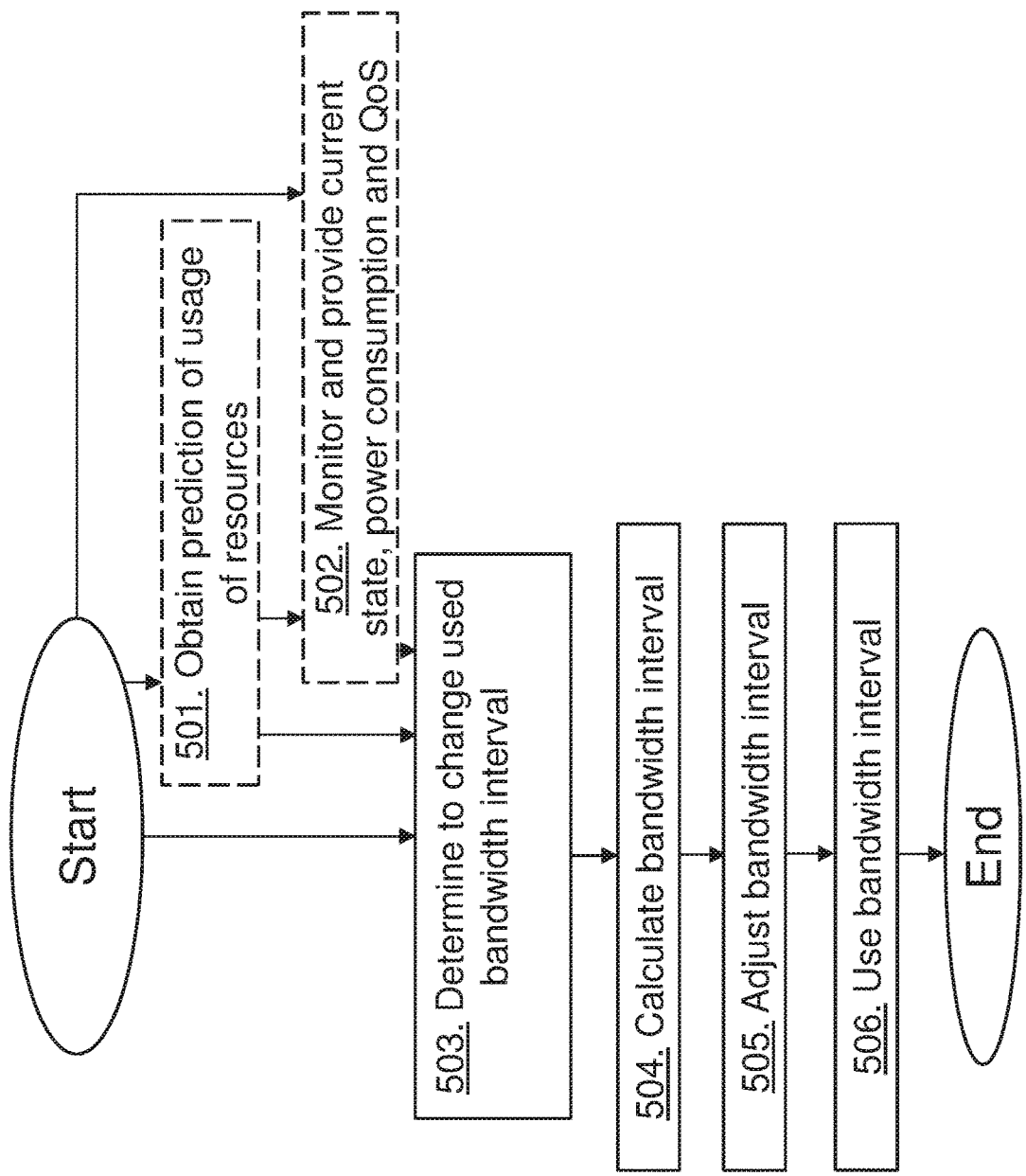
FIG. 5 shows a flowchart depicting a method performed by a radio network node according to embodiments herein.

This is an example of action 503 of FIG. 5 below.

Controller C 42: This is an actuator component that resides e.g. inside the Base Band Unit (BBU).

i. Input from D 41. If the IBW is changed, then C 42 does the next step, else it simply skips further actions i.e. no IBW change indicated by D 41.

ii. Computes the new IBW range [x-y] including where to move the UEs in the band considering their physical position and proximity to each other so that they fall within the recommended IBW. If it is possible within service level agreements (SLA) to do that then next step.

iii. Send commands to the Baseband to compact users in case IBW is being squished iv. Adjust the IBW This is an example of actions 504-506 of FIG. 5 below.

More details about the learning phase of the Decider Component "D" 41 denoted as inner loop in FIG. 4. The decider learning may be implemented as a machine learning (ML) model. Given that state S it uses its learnt model to suggest an action A, which is one of the new IBW bandwidths.

Implementation for the learning module in the Decider 41 component:

The decider may learn by a Reinforcement Learning (RL) process, for example Q-learning Learning inputs may be S, A, and R, where R is the reward or profit received for the system having taken the action A in the state S. The learning adjusts weight values e.g. Q values in accordance with the standard equation.

R may be modeled as the benefit accrued. This combines (a) the power savings resulting reducing the IBW (in steps) and (b) the resulting QoS impact, e.g. the model may also take into account Call Setup Success Rate (CSSR) and Drop Call Rate (DCR) which are usually measured. Thus, negative impact on the QoS may be penalized in the ML model as a negative profit value. The two are combined in this one reward R. This learning maybe done with offline information available (past decisions taken) and it may be further updated during online operations as indicated by the inner loop in FIG. 4.

It should be noted that the outer loop in FIG. 4 is the normal operational functioning of the system as mentioned earlier in this section where the output from D 41 is the input to the Controller Component, C 42, which does the job of reassigning UEs within the new band and sending actuations to the Actuator for the BBU.

The method actions performed by the radio network node for handling communication over a bandwidth interval for one or more UEs in the wireless communication network according to embodiments will now be described with reference to a flowchart depicted in FIG. 5. The actions do not have to be taken in the order stated below, but may be taken in any suitable order. Actions performed in some embodiments are marked with dashed boxes.

Action 501. The radio network node 12 may obtain a prediction a usage of resources in a bandwidth interval related to number of UEs served and/or positions of the number of UEs served e.g. since close UEs may cause interference towards one another. E.g. the radio network node 12 may receive the prediction from another network node or perform the prediction itself.

Action 502. The radio network node 12 may monitor and provide the current state, power consumption and QoS to the reinforcement learning process. This may thus be used to learn the ML model (inner loop) as well as used when determining a present IBW with the aid of the predicted usage (outer loop). Thus, this may be used in the inner loop and in the outer loop.

Action 503. The radio network node 12 determines to change a currently used bandwidth interval based on a current state of usage of resources in the currently used bandwidth interval related to number of UEs served and/or a current state of positions of the number of UEs served. The radio network node 12 may determine to change the currently used bandwidth interval further based on the predicted usage and/or positions. The radio network node may perform the determination using a reinforcement learning process based on power savings when reducing the currently used bandwidth and resulting QoS impact, denoted as the inner loop in FIG. 4. The reinforcement learning process may be implemented as a ML model, wherein for the current state, S, a changed bandwidth, A, is suggested. The learning inputs may be the current state S, changed bandwidth A, and parameter R, where parameter R is a profit having taken the changed bandwidth, A, in the current state, S. E.g. when ML is predicting, the ML proposes some rewards to different states. In this case it is called Profit, best performing used bandwidth. Parameter R may be modelled as the profit accrued based on a combination of power savings resulting from reducing the currently used bandwidth and impact of QoS. The reinforcement learning process, i.e. the inner loop, may be performed based on past decisions taken, and updated during current operations. The radio network node 12 may perform the determination (outer loop) using an outer ML model using as inputs: current number of UEs; information about UE position and their proximity to each other; the currently used bandwidth, predictions of number of number of UEs served and/or positions of the number of UEs, and the outer ML model outputs a decision to reduce or increases the currently used bandwidth, and by how much. The outer ML model may use the trained ML model (inner loop).

Action 504. The radio network node 12, with the proviso that it is determined to change the currently used bandwidth interval i.e. in case determined to change the currently used bandwidth interval, calculates a changed bandwidth interval to use.

Action 505. The radio network node 12 adjusts the currently used bandwidth interval to the calculated bandwidth interval. The radio network node 12 may adjust the bandwidth interval by moving usage of resource for UEs into the adjusted bandwidth interval considering physical position of the number of UEs and proximity to one another e.g. to not impact QoS (interference) between one another. The adjusted bandwidth interval may be one of the following: 1.4, 3, 5, 10, 15, 20 MHz.

Action 506. The radio network node 12 uses the adjusted bandwidth interval for communicating with the one or more UEs. The radio network node 12 may use the adjusted bandwidth by sending a command to a baseband unit to compact resources used by UEs within the adjusted bandwidth interval. E.g. the radio network node 12 may in case reduction of the bandwidth interval is determined send order to BBU to compact usage of resource in the adjusted bandwidth interval.

It is herein disclosed an automatic method, for improving energy efficiency, and create power savings by adjusting bandwidth interval such as the IBW.

FIG. 6 is a block diagram depicting the radio network node 12 in two embodiments for handling communication over the bandwidth interval for one or more UEs in the wireless communication network according to embodiments herein.

The radio network node 12 such as a radio base station may comprise processing circuitry 601, e.g. one or more processors, configured to perform the methods herein.

The radio network node 12 may comprise a determining unit 602. The radio network node 12, the processing circuitry 601 and/or the determining unit 602 is configured to determine to change the currently used bandwidth interval based on the current state of usage of resources in the currently used bandwidth interval related to number of UEs served and/or the current state of positions of the number of UEs served. The radio network node 12, the processing circuitry 601 and/or the determining unit 602 may be configured to determine to change the currently used bandwidth interval by using a reinforcement learning process based on power savings when reducing the currently used bandwidth and the resulting QoS impact. The radio network node 12, the processing circuitry 601 and/or the determining unit 602 may be configured to perform the reinforcement learning process based on past decisions taken, and updated during current operations. The radio network node 12, the processing circuitry 601 and/or the determining unit 602 may be configured to determine to change the currently used bandwidth interval by using the outer ML model using as inputs: current number of UEs; information about UE position and their proximity to each other; the currently used bandwidth, predictions of number of number of UEs served and/or positions of the number of UEs, and the outer ML model outputs a decision to reduce or increases the currently used bandwidth, and by how much. The ML model may use the output from the reinforcement learning process as input e.g. outer loop uses result of inner loop.

The radio network node 12 may comprise a calculating unit 603. The radio network node 12, the processing circuitry 601 and/or the calculating unit 603 is configured to, with the proviso that it is determined to change the currently used bandwidth interval, calculate a changed bandwidth interval to use.

The radio network node 12 may comprise an adjusting unit 604. The radio network node 12, the processing circuitry 601 and/or the adjusting unit 604 is configured to adjust the currently used bandwidth interval to the calculated bandwidth interval. The radio network node 12, the processing circuitry 601 and/or the adjusting unit 604 may be configured to adjust the currently used bandwidth interval by moving usage of resource for UEs into the adjusted bandwidth interval considering physical position of the number of UEs and proximity to one another. The adjusted bandwidth interval may be one of the following: 1.4, 3, 5, 10, 15, 20 MHz.

The radio network node 12 may comprise a using unit 605. The radio network node 12, the processing circuitry 601 and/or the using unit 605 is configured to use the adjusted bandwidth interval for communicating with the one or more UEs. The radio network node 12, the processing circuitry 601 and/or the using unit 605 may be configured to use the adjusted bandwidth by sending the command to the baseband unit to compact resources used by UEs within the adjusted bandwidth interval e.g. when the bandwidth interval is reduced.

The radio network node 12 may comprise a predicting unit 606. The radio network node 12, the processing circuitry 601 and/or the predicting unit 606 may be configured to obtain the prediction, e.g. predict, of the usage of resources in the bandwidth interval related to number of UEs served and/or positions of the number of UEs served. The radio network node 12, the processing circuitry 601 and/or the determining unit 602 may then be configured to determine to change the currently used bandwidth interval further based on the predicted usage and/or positions.

The radio network node 12 may comprise a monitoring unit 607. The radio network node 12, the processing circuitry 601 and/or the monitoring unit 607 may be configured to monitor and provide the current state, the power consumption and the QoS to the reinforcement learning process. The reinforcement learning process may be implemented as a ML model, wherein for the current state, S, the changed bandwidth, A, is suggested. The learning inputs may be the current state S, the changed bandwidth A, and the parameter R, where parameter R is the profit having taken the changed bandwidth, A, in the current state, S. The parameter R may be modelled as the profit accrued based on a combination of power savings resulting from reducing the currently used bandwidth and impact of QoS.

The radio network node 12 further comprises a memory 608. The memory comprises one or more units to be used to store data on, such as indications, ML models, monitored QoSs, IBWs, applications to perform the methods disclosed herein when being executed, and similar. Thus, the radio network node 12 may comprise the processing circuitry and the memory, said memory comprising instructions executable by said processing circuitry whereby said radio network node is operative to perform the methods herein. The radio network node 12 may comprise a communication interface comprising a transmitter, a receiver, a transceiver and/or one or more antennas.

The methods according to the embodiments described herein for the radio network node 12 are respectively implemented by means of e.g. a computer program product 609 or a computer program, comprising instructions, i.e., software code portions, which, when executed on at least one processor, cause the at least one processor to carry out the actions described herein, as performed by the radio network node 12. The computer program product 609 may be stored on a computer-readable storage medium 610, e.g. a disc, a universal serial bus (USB) stick, or similar. The computer-readable storage medium 610, having stored thereon the computer program product 609, may comprise the instructions which, when executed on at least one processor, cause the at least one processor to carry out the actions described herein, as performed by the radio network node 12. In some embodiments, the computer-readable storage medium may be a non-transitory or a transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 7:
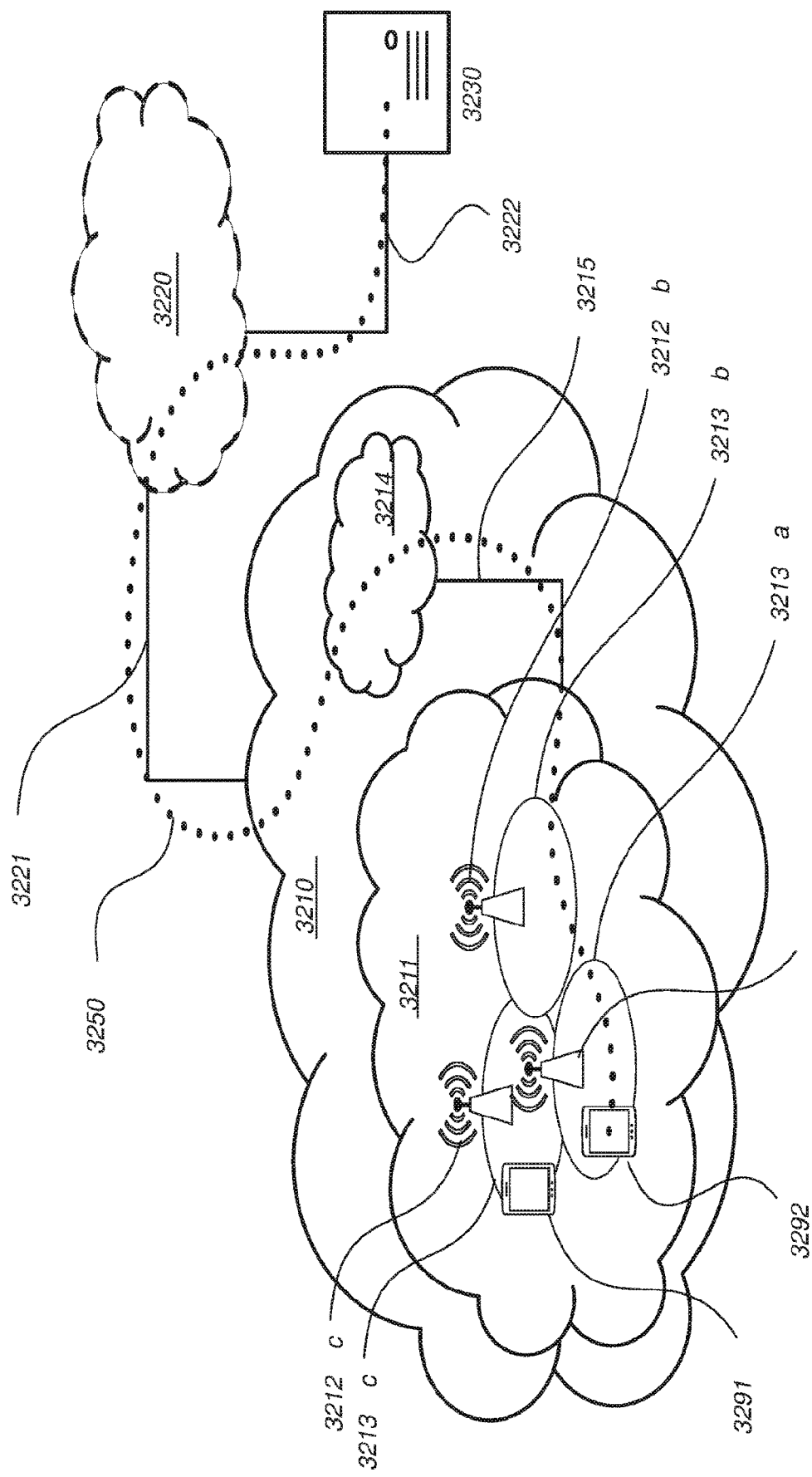
FIG. 7 is a schematic diagram depicting a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
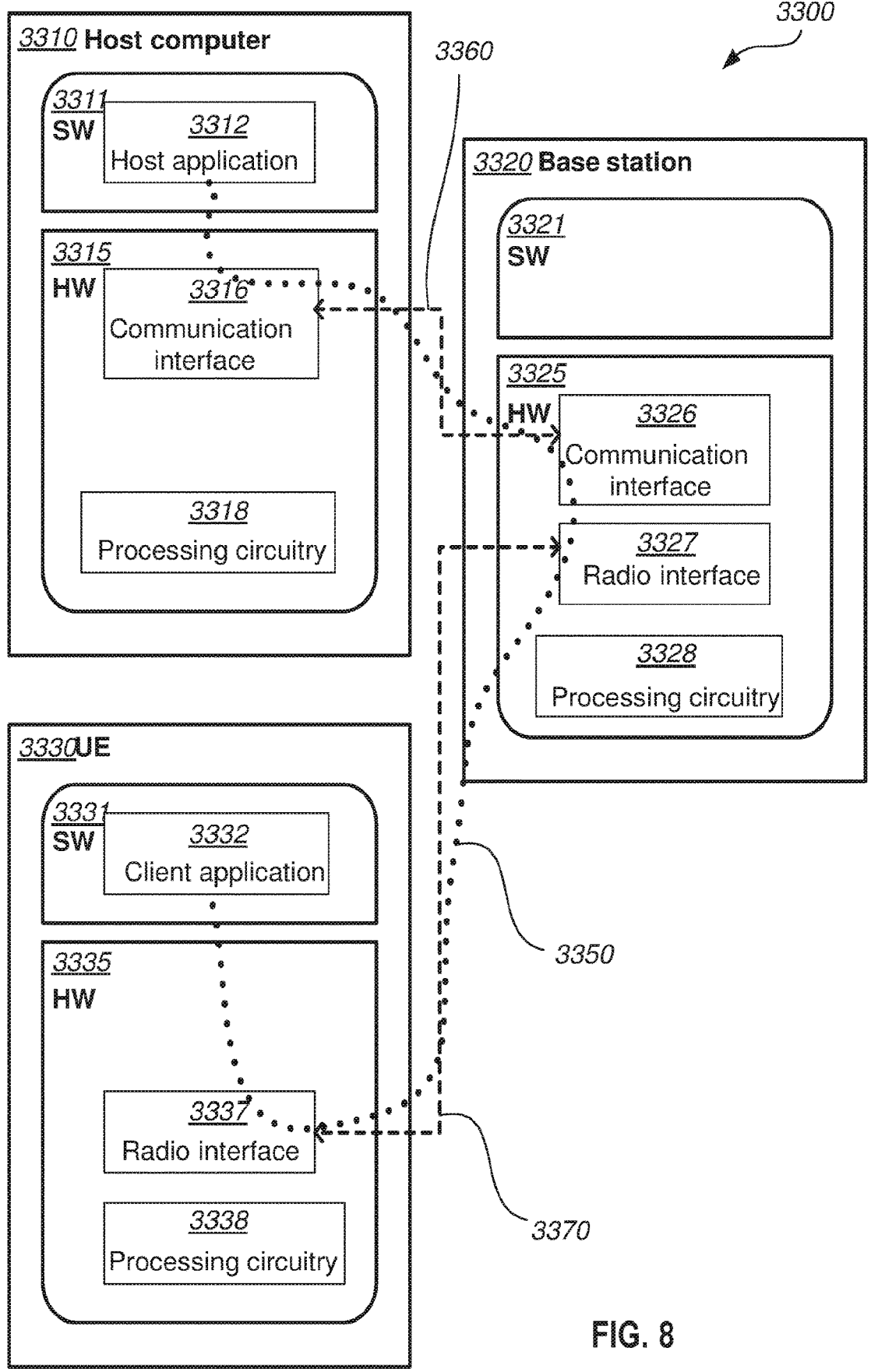
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve handling of radio resources efficiently and thereby provide benefits such as reduced used IBW, and better battery time for e.g. base stations and for UEs.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 11, 12:
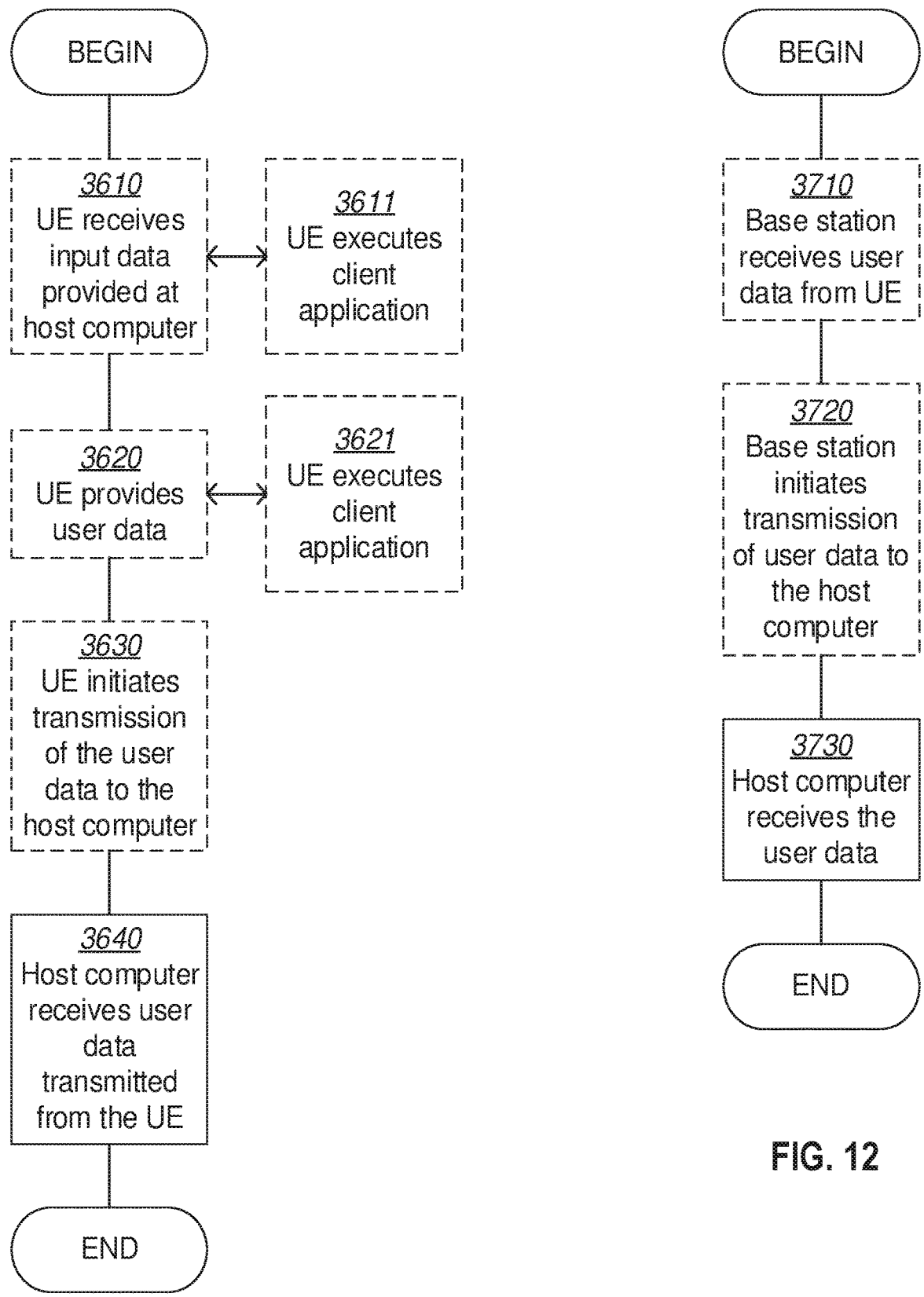

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node in a wireless communication network, the method comprising:
   determining to change a currently used bandwidth interval used by the radio network node for communicating with one or more user equipments (UEs), referred to as served UEs, wherein the determination is based on at least one of: positions of the served UEs, or resource usage in the currently used bandwidth interval;
   adjusting the currently used bandwidth interval to an adjusted bandwidth interval; and
   using the adjusted bandwidth interval for communicating with the served UEs;
   wherein determining to change the currently used bandwidth interval is further based on at least one of: a prediction of resource usage corresponding to increasing or decreasing the currently used bandwidth interval, or a prediction of positions of the served UE.

2. The method according to claim 1, wherein using the adjusted bandwidth interval for communicating with the served UEs comprises reassigning the served UEs to respective resources in the adjusted bandwidth interval, based on at least one of: the number of served UEs and proximities of the served UEs to each other, as said positions of the served UEs.

3. The method according to the claim 2, wherein reassigning the served UEs to respective resources in the adjusted bandwidth interval comprises sending a command to a baseband unit to compact resources used by the served UEs within the adjusted bandwidth interval.

4. The method according to claim 1, wherein the determination is performed using a reinforcement learning process and is based on power savings that would be obtained from reducing the currently used bandwidth interval and a resulting quality of service (QoS) impact.

5. The method according to claim 4, further comprising monitoring the positions of the served UEs, the resource usage in the currently used bandwidth interval, a power consumption associated with use of the currently used bandwidth interval, QoS of the served UEs, and providing corresponding monitoring information to the reinforcement learning process.

6. The method according to claim 4, wherein the reinforcement learning process is implemented as a machine learning model, wherein for the current state(S), a changed bandwidth (A) is suggested, and wherein learning inputs are the current state S, the changed bandwidth A, and a parameter (R), where the parameter R is a profit having taken the changed bandwidth, A, in the current state, S.

7. The method according to claim 6, wherein the parameter R is modelled as the profit accrued based on a combination of power savings resulting from reducing the currently used bandwidth interval and the resulting QoS impact.

8. The method according to claim 4, wherein the reinforcement learning process is performed based on past decisions taken and updated during current operations.

9. A method performed by a radio network node in a wireless communication network, the method comprising:
   determining to change a currently used bandwidth interval used by the radio network node for communicating with one or more user equipments (UEs), referred to as served UEs, wherein the determination is based on at least one of: positions of the served UEs, or resource usage in the currently used bandwidth interval;
   adjusting the currently used bandwidth interval to an adjusted bandwidth interval; and
   using the adjusted bandwidth interval for communicating with the served UEs;
   wherein the determination is performed using an outer machine learning (ML) model using as inputs:
   current number of served UEs;
   information about positions of the served UEs, including proximities of served UEs to each other;
   the currently used bandwidth interval;
   predictions of one or both a change in the number of served UEs or changes in the positions of the served UEs; and
   wherein the outer ML model outputs a decision to reduce or increase the currently used bandwidth interval, and by how much.

10. The method according to claim 9, wherein the adjusted bandwidth interval is one of the following 1.4, 3, 5, 10, 15, or 20 MHz.

11. A radio network node for operation in a wireless communication network, wherein the radio network node comprises:
    a communication interface configured for communicating with one or more user equipments (UEs), referred to as served UEs; and
    processing circuitry operatively associated with the communication interface and configured to:
    determine to change a currently used bandwidth interval, which is used for communicating with the served UEs, wherein the determination is based on at least one of: positions of the served UEs, or resource usage in the currently used bandwidth interval;
    adjust the currently used bandwidth interval to an adjusted bandwidth interval; and
    use the adjusted bandwidth interval for communicating with the served UEs;
    wherein the processing circuitry is configured to determine to change the currently used bandwidth interval further based on at least one of: a prediction of resource usage corresponding to increasing or decreasing the currently used bandwidth interval, or a prediction of positions of the served UEs.

12. The radio network node according to claim 11, wherein, with respect to using the adjusted bandwidth interval for communicating with the served UEs, the processing circuitry is configured to reassign the served UEs to respective resources in the adjusted bandwidth interval, based on at least one of: the number of served UEs, and proximities of the served UEs to each other, as said positions of the served UEs.

13. The radio network node according to the claim 12, wherein, to reassign the served UEs to respective resources in the adjusted bandwidth interval, the processing circuitry is configured to send a command to a baseband unit to compact resources used by the served UEs within the adjusted bandwidth interval.

14. The radio network node according to claim 11, wherein the determination is performed using a reinforcement learning process and is based on power savings that would be obtained by reducing the currently used bandwidth and a resulting quality of service (QoS) impact.

15. The radio network node according to claim 14, wherein the processing circuitry is configured to monitor the positions of the served UEs, the resource usage in the currently used bandwidth interval, a power consumption associated with use of the currently used bandwidth interval, and QoS of the served UEs, and provide corresponding monitoring information to the reinforcement learning process.

16. The radio network node according to claim 14, wherein the reinforcement learning process is implemented as an machine learning model, wherein for the current state(S), a changed bandwidth (A) is suggested, and wherein learning inputs are the current state S, the changed bandwidth A, and a parameter (R), where the parameter R is a profit having taken the changed bandwidth, A, in the current state, S.

17. The radio network node according to claim 16, wherein the parameter R is modelled as the profit accrued based on a combination of power savings resulting from reducing the currently used bandwidth and the resulting QoS impact.

18. A radio network node for operation in a wireless communication network, wherein the radio network node comprises:

a communication interface configured for communicating with one or more user equipments (UEs), referred to as served UEs; and processing circuitry operatively associated with the communication interface and configured to:
  determine to change a currently used bandwidth interval, which is used for communicating with the served UEs, wherein the determination is based on at least one of: positions of the served UEs, or resource usage in the currently used bandwidth interval;
  adjust the currently used bandwidth interval to an adjusted bandwidth interval; and
  use the adjusted bandwidth interval for communicating with the served UEs;

wherein the radio network node is configured to determine to change the currently used bandwidth interval by using an outer machine learning (ML) model using as inputs: the current number of served UEs; the positions of the served UEs, including proximities of the served UEs to each other; the currently used bandwidth; predictions of one or both a change in the number of served UEs, or a change in the positions of the served UEs; and wherein the outer ML model outputs a decision to reduce or increase the currently used bandwidth, and by how much.

* * * * *